(12) United States Patent
Luo

(10) Patent No.: US 7,672,025 B2
(45) Date of Patent: Mar. 2, 2010

(54) APPARATUS FOR DETECTING FRONT EDGE OF A DOCUMENT AND DETERMINING THE HOME POSITION OF AN IMAGE SCANNING MODULE

(75) Inventor: Chun-Hung Luo, Miaoli Country (TW)

(73) Assignee: Lite-On Technology Coporation, Taipei (TW)

( * ) Notice: Subject to any disclaimer, the term of this patent is extended or adjusted under 35 U.S.C. 154(b) by 0 days.

(21) Appl. No.: 12/205,007

(22) Filed: Sep. 5, 2008

(65) Prior Publication Data

US 2009/0002781 A1    Jan. 1, 2009

Related U.S. Application Data

(62) Division of application No. 11/250,493, filed on Oct. 17, 2005, now abandoned.

(30) Foreign Application Priority Data

Jul. 13, 2005   (TW)   ............................... 94123801 A

(51) Int. Cl.
*H04N 1/04* (2006.01)
(52) U.S. Cl. ....................... 358/486; 358/488; 358/496; 358/497; 358/474

(58) Field of Classification Search ................. 358/497, 358/474, 496, 498, 408, 488, 486, 505, 475, 358/509; 399/367, 371, 211, 212; 250/234–236, 250/216; 382/312, 318, 319
See application file for complete search history.

(56) References Cited

U.S. PATENT DOCUMENTS

| | | | |
|---|---|---|---|
| 3,936,041 A * | 2/1976 | Shiina et al. ................ | 271/4.03 |
| 6,252,684 B1 | 6/2001 | Lin et al. | |
| 7,130,090 B2 | 10/2006 | Reid et al. | |
| 7,327,502 B2 | 2/2008 | Sheng et al. | |
| 2006/0226233 A1 * | 10/2006 | Tsai ....................... | 235/472.01 |

FOREIGN PATENT DOCUMENTS

CN            2676528 Y       2/2005

\* cited by examiner

*Primary Examiner*—Cheukfan Lee
(74) *Attorney, Agent, or Firm*—Rabin & Berdo, P.C.

(57) ABSTRACT

An apparatus for detecting front edge of a document and determining home position of an image scanning module has a detecting light source near an outlet end of a document feeding track and aligned with an image reader of the image scanning module. The detecting light source emits a detecting light to be received by the image reader. By detecting whether the detecting light is received by the image reader, the front edge of the document can be detected to activate the image scanning module. And it can also determine whether or not the image scanning module has arrived on a home position.

4 Claims, 4 Drawing Sheets

APPARATUS FOR DETECTING FRONT EDGE OF A DOCUMENT AND DETERMINING THE HOME POSITION OF AN IMAGE SCANNING MODULE

CROSS-REFERENCE TO RELATED APPLICATION

This is a division of U.S. application Ser. No. 11/250,493, filed Oct. 17, 2005, now abandoned which claimed Priority from Taiwanese application No. 094123801, filed Jul. 13, 2005, the entire disclosure of which is incorporated herein by reference.

BACKGROUND OF THE INVENTION

1. Field of Invention

The invention relates to an image scanning device, and particularly to an apparatus for detecting front edge of a document and determining the home position of an image scanning module 2. Related Art Referring to FIGS. 1, 2A and 2B, a conventional image scanning device 1 such as a Multi-Function Peripheral (MFP), image scanner, or copier is equipped with an image scanning function to duplicate and transform images into electronic data for storage or into documents by printing. The image scanning device 1 has a scanning platform 2, an image scanning module 3 below the scanning platform 2, and a conveyor 4 to drive the image scanning module 3 back and forth. While scanning images on a document, one side of the document to be scanned is placed on the scanning platform 2. The conveyor 4 drives the image scanning module 3 back and forth to scan the images on the document.

For scanning a greater amount of documents, an Automatic Document Feeder (ADF) 5 is used to feed the documents sequentially into the image scanning device 1. The documents 6 to be scanned are moved above the image scanning module 3 to perform scanning. The documents 6 are fed by the ADF 5, and the image scanning module 3 remains stationary.

The image scanning module 3 is at a standby state in normal conditions. When the front edge 6a of a document arrives at the upper side of the image scanning module 3, the image scanning module 3 is activated to process scanning. Such a design aims to save power and increase the life span of the image scanning module 3. It also prevents the image scanning module 3 from scanning the area outside the document 6. So that the memory buffer space occupied by the electronic data transformed from the image of the document 6 will be minimized. In the conventional approach the document 6 is driven by a plurality of feeding rollers 5a. A trigger 5b of a detector is used to be pushed by the front edge 6a of the document 6. The feeding rollers 5a rotate and feed the document 6 through a document feeding track 7 towards the image scanning module 3. Before the document 6 arrives at the image scanning module 3, the front edge 6a of the document 6 pushes the trigger 5b to generate a trigger signal. Depending on the distance between the trigger 5b and the image scanning module 3 and the displacement of the document 6 generated by rotation of the feeding rollers 5a, a control circuit in the scanning device 1 starts counting the revolutions of the feeding rollers 5a. When the document displacement generated by the rotation of the feeding rollers 5a is approximate to the distance between the trigger 5b and the image scanning module 3, the image scanning module 3 is activated to process scanning. However, the trigger 5b is a mechanical structure, its precision is lower. When the trigger 5b is pushed by the document 6 to generate the trigger signal, an error occurs on the actual position of the front edge 6a of the document 6. In addition, an error in document displacement is occurred while the feeding rollers 5a drive the document 6. The error in actual position of the front edge 6a and the error in document displacement result in the image scanning module 3 not being activated as the front edge 6a just arrives, so that distortion of image scanning is occurred.

If the ADF 5 is not used, and manual feeding of a single document is employed, one document is placed on the scanning platform 2 with the text or image side down. One edge of the document 6 has to be aligned on a starting line (not shown in the drawings). The starting line corresponds to the home position of the image scanning module 3. During scanning operation, the conveyor 4 drives the image scanning module 3 to perform scanning operation from the home position until reaching another edge of the document. After the scanning operation is finished, the conveyor 4 moves the image scanning module 3 back to the home position. Then the conveyor 4 stops driving the image scanning module 3. The image scanning module 3 stops on the home position to wait for the next scanning operation. To control the image scanning module 3 to stop precisely on the home position, the general approach is to install a first sensor 8a and a second sensor 8b on the image scanning module 3 and the image scanning device 1 respectively. The first sensor 8a corresponds to the home position. When the image scanning module 3 is located on the home position, induction occurs between the first sensor 8a and the second sensor 8b and a detection signal is generated to stop operation of the conveyor 4. This approach requires additional sensors on the image scanning module 3 and the image scanning device 1. Thus fabrication time and cost are higher.

SUMMARY OF THE INVENTION

In view of the aforesaid problems, the object of the invention is to provide an apparatus for detecting the front edge of a document and determining the home position of an image scanning module that can operate precisely and simplify the structure of a scanning device.

In order to achieve the foregoing object, the apparatus for detecting the front edge of a document and determining the home position of an image scanning module according to the invention is installed on an image scanning device to detect the front edge of the document or determine the home position of the image scanning module. The apparatus of the invention includes an image scanning module, a document feeding track and a detecting light source. The image scanning module includes an image reader and a scanning light source. The document feeding track has an inlet end and an outlet end. The inlet end is to feed documents sequentially into the document feeding track, and the outlet end is to receive the documents discharged from a paper path of the document feeding track corresponding to the image scanning module. The detecting light source is located on the documents feeding track and over which the document passes to emit detecting light received by the image reader of the image scanning module. Thereby, when the front edge of a document arrives between the image reader and the detecting light source, the detecting light is blocked by the document and then the image scanning module is activated. The scanning light source starts emitting scanning light to perform scanning operation.

As the image scanning module is moved back to a home position after scanning a document placed on the scanning platform, the detecting light source emits the detecting light simultaneously corresponding to the home position of the image scanning module. When the image scanning module is located on the home position, the image reader can receive the detecting light and generate a stopping signal to enable the image scanning module to stop on the home position precisely.

The invention can achieve the following results: by merely adding a detecting light source to cooperate with image scanning module, detection of the document front edge and determination of the home position of the image scanning module can be accomplished at the same time. Besides, the structure of the apparatus is simplified, so that fabrication is simpler. When adopted for detecting the front edge of a document, the present invention can precisely detect the front edge of the document above the image scanning module. The precision is higher than the conventional mechanical detection design. The present invention also can position the image scanning module on the home position at the same time without adding extra detection elements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The apparatus for detecting the front edge of a document and determining the home position of an image scanning module of the invention is installed on an image scanning device that has an automatic document feeder to detect the front edge of the document and positioning the image scanning module precisely on a home position. The image scanning device may be a Multi-Function Peripheral (MFP), flatbed scanner, copier, or the like for scanning a large amount of documents.

Figure 1:
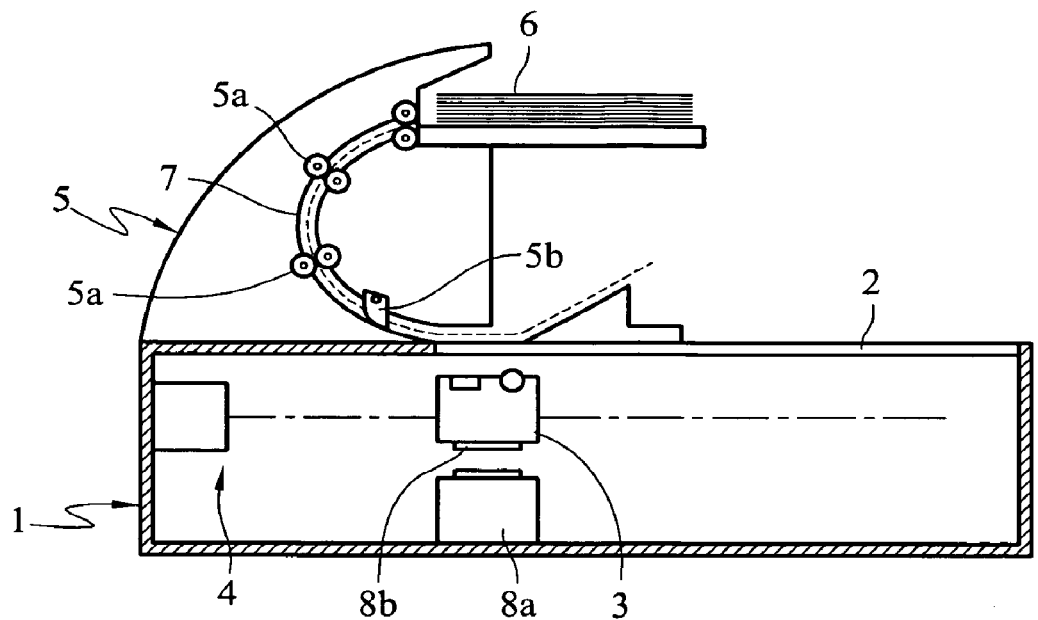
FIG. 1 is a sectional view of a conventional automatic document feeder and scanning device.
Figure 2A:
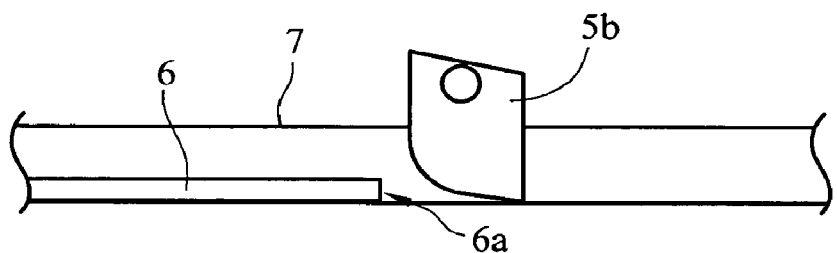
FIGS. 2A and 2B are fragmentary enlarged views of a conventional automatic document feeder.
Figure 2B:
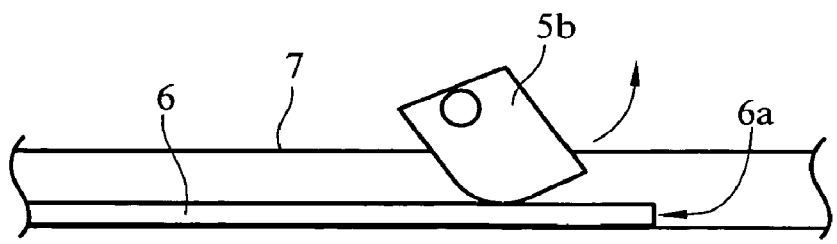
Figure 3:
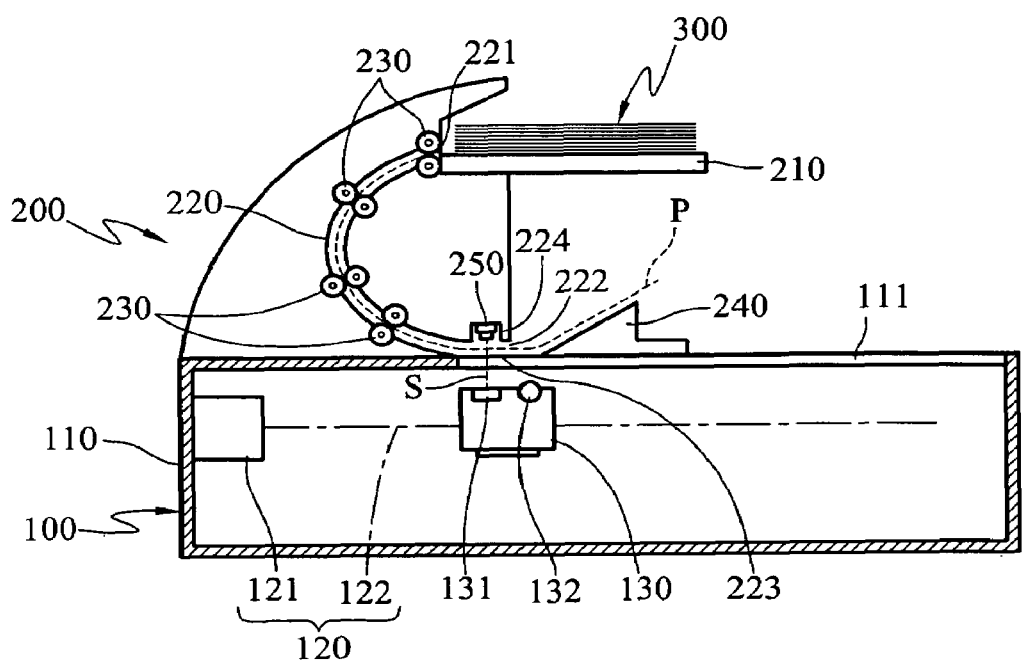
FIG. 3 is a sectional view of an embodiment of the invention.

Referring to FIG. 3, the scanning device generally includes a body 100 to perform scanning operation and an automatic document feeder 200.

The body 100 includes a housing 110 with a scanning platform 111 to hold a document 300 to be scanned. Under the scanning platform 111, there are a conveying module 120 and an image scanning module 130. The conveying module 120 is for conveying the image scanning module 130 from a home position back and forth under the scanning platform 111, so that the image scanning module 130 can scan the document 300 which is placed on the scanning platform 111. The conveying module 120 includes a motor 121 and a conveying element 122. The motor 121 may be a step motor or a DC motor. The conveying element 122 may be a screw, a belt, a combination of gears and racks, or a combination thereof to be coupled with the motor 121 and the image scanning module 130, so that the image scanning module 130 can be driven by the motor 121 to move back and forth. Also, the body 100 has a control circuit (not shown in the drawings) to control the image scanning module 130 and the motor 121.

The image scanning module 130 includes at least an image reader 131 and a scanning light source 132. The image reader 131 has a photosensitive element (such as CCD, CIS or the like), lenses and reflective mirrors to receive a light and transform the light to electronic signals. The scanning light source 132, such as a tubular fluorescent lamp, irradiates a light to the document 300, and then a reflex reflected from the document 300 is received by the image reader 131. Details and operation principles of the image reader 131 and the scanning light source 132 are known in the art and are thus omitted hereinafter.

The automatic document feeder 200 is located on one side of the top of the body 100. It has a feeding tray 210, a document feeding track 220, a plurality of feeding rollers 230 and an exit tray 240. The feeding tray 210 is to hold a plurality of documents 300 to be scanned. The documents 300 are fed sequentially into the document feeding track 220. The document feeding track 220 has an inlet end 221 and an outlet end 222. The inlet end 221 is connected to the feeding tray 210 to receive the documents 300 sequentially into the document feeding track 220. The outlet end 222 is adjacent one side of the scanning platform 111 and also is connected to the exit tray 240 for receiving the documents 300 discharged from a paper path P (as the dotted line) of the document feeding track 220, so that a scanning window 223 is formed over the scanning platform 111 corresponding to the home position of the image scanning module 130 and opposite the image scanning module 130. The image scanning module 130 can scan the document 300 passing over the scanning window 223 from the home position through the scanning window 223. The feeding rollers 230 are located on two sides of the document feeding track 220 and rotate on two sides thereof to drive the document 300 from the inlet end 221 towards the outlet end 222.

The document feeding track 220 has a detecting window 224 over which the document 300 passes corresponding to the scanning window 223. A detecting light source 250 is mounted in the detecting window 224 near the outlet end 222 and aligned with the image reader 131. When the image scanning module 130 is located on the home position, it is corresponding to the detecting light source 250. The detecting light source 250 can emit a detecting light S to be received by the image reader 131 of the image scanning module 130, so that the image scanning module 130 maintains a selected voltage potential.

Figure 4:
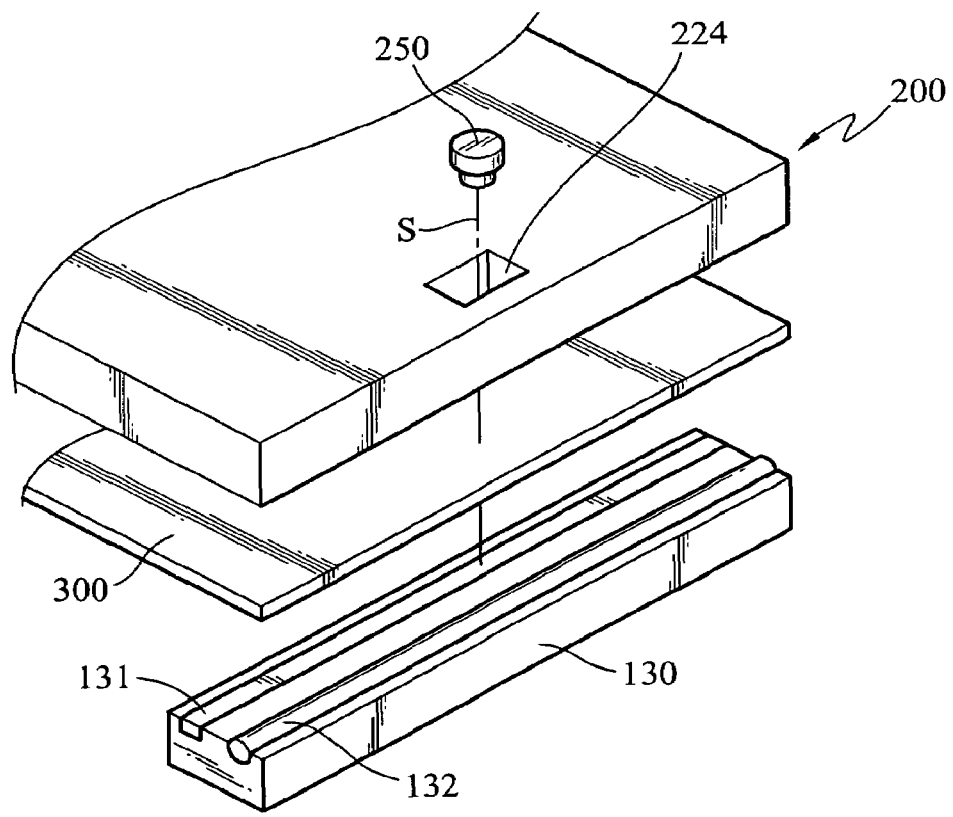
FIG. 4 is a fragmentary exploded view of an embodiment of the invention.
Figure 5A:
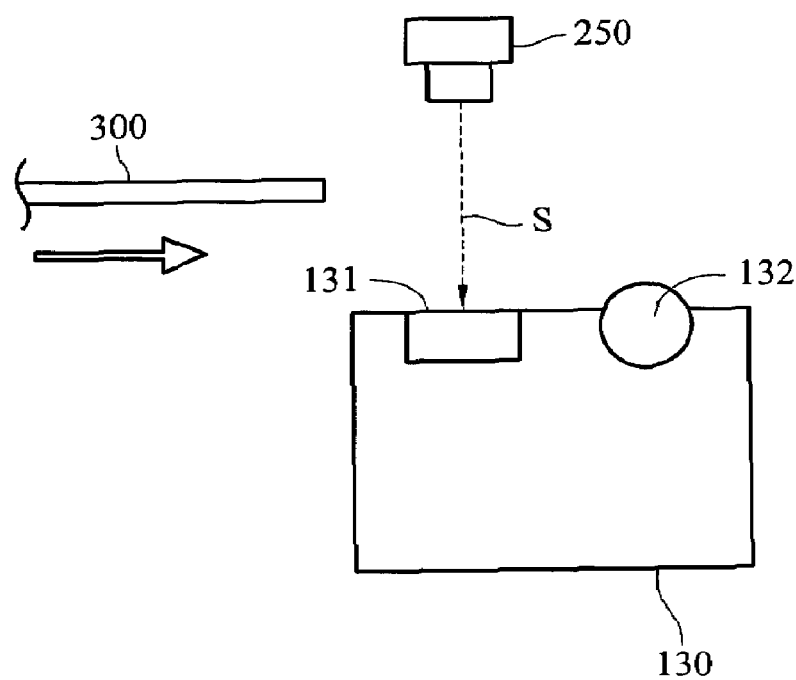
FIGS. 5A and 5B are schematic views of an embodiment of the invention for detecting a document front edge.
Figure 5B:
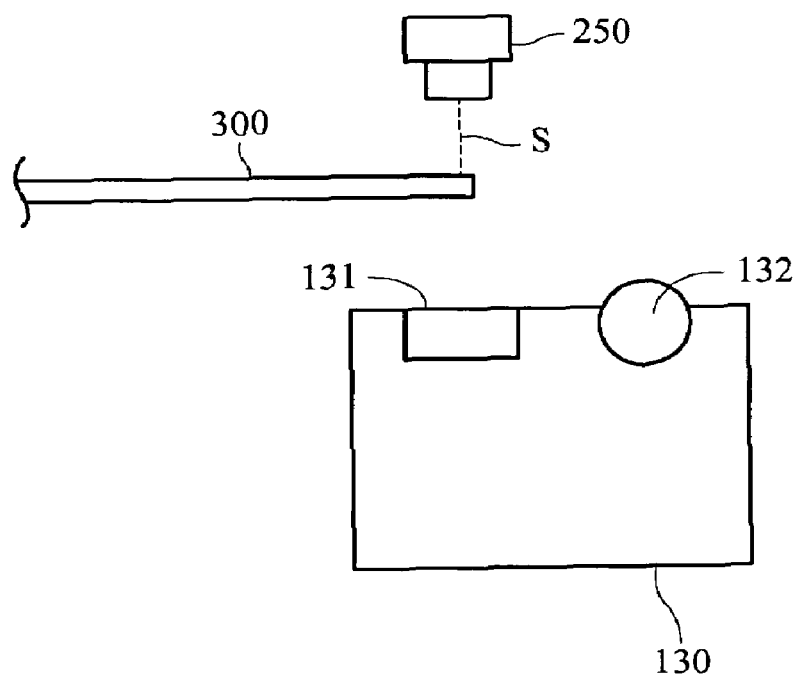

Referring to FIGS. 4, 5A and 5B, when the automatic document feeder 200 conveys the document 300, the image scanning module 130 is located on the home position to scan the document 300 through the scanning window 223. The document 300 are stacked on the feeding tray 210 and loaded sequentially into the document feeding track 220 by the feeding rollers 230 from the inlet end 221 towards the outlet end 222. Then the image scanning module 130 scans each of the documents 300 passing over the scanning window 223. Before the document 300 arrives in the scanning window 223, the image scanning module 130 is on standby mode so that the scanning light source 132 does not emit scanning light to waste power and reduce the life span of the scanning light source 132. The image reader 131 also does not have to read a great amount of blank data occupying unnecessary memory buffer space of the scanning device.

When the front edge of the document 300 arrives in the scanning window 223 and between the image reader 131 and detecting light source 250, the detecting light S is blocked by the document 300, so that the image reader 131 cannot receive the detecting light S. Then the image scanning module 130 changes its voltage potential. Hence the control circuit transmits a trigger signal to activate the image scanning module 130, and the scanning light source 132 starts to irradiate scanning light to the document 300 through the scanning window 223. The image reader 131 receives a reflex reflected from the document 300 and transforms the image of the document 300 into electronic data. After the document 300 has passed over the scanning window 223 completely and leaves the outlet end 222 of the document feeding track 220, the image scanning module 130 suspends scanning operation. The scanning light source 132 is turned off, and the image scanning module 130 enters the standby mode. Meanwhile, the detecting light S emitted from the detecting light source 250 is continuously received by the image reader 131 of the image scanning module 130 and waits the detecting light S to be blocked to activate the scanning operation again. Only when the front edge of the document 300 arrives above the image reader 131 to block the detecting light S, the image scanning module 130 can be activated, so the precision of detecting the front edge of the document is enhanced.

When the automatic document feeder 200 is not in use, the document 300 can be placed on the scanning platform 111 individually, and the image scanning module 130 is driven by the conveying module 120 from the home position to move back and forth horizontally to scan the document 300. The image scanning module 130 has to perform the scanning operation from the home position, otherwise the area scanned of the document will be smaller than the actual size of the document 300 and a portion of image data could be lost. Or the area scanned of the document will be greater than the actual size of the document 300 and result in scanning a large amount of blank data occupying unnecessary memory buffer space. The embodiment of the invention can also determine the home position of the image scanning module 130 precisely.

Figure 6A:
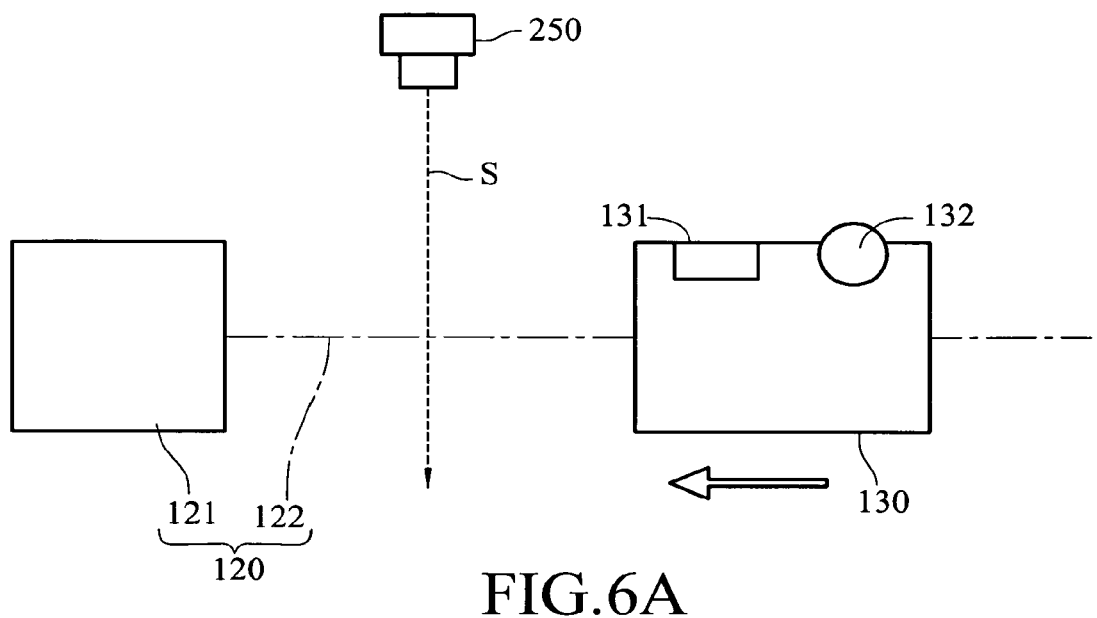
FIGS. 6A and 6B are schematic views of an embodiment of the invention for positioning an image scanning module on a home position.
Figure 6B:
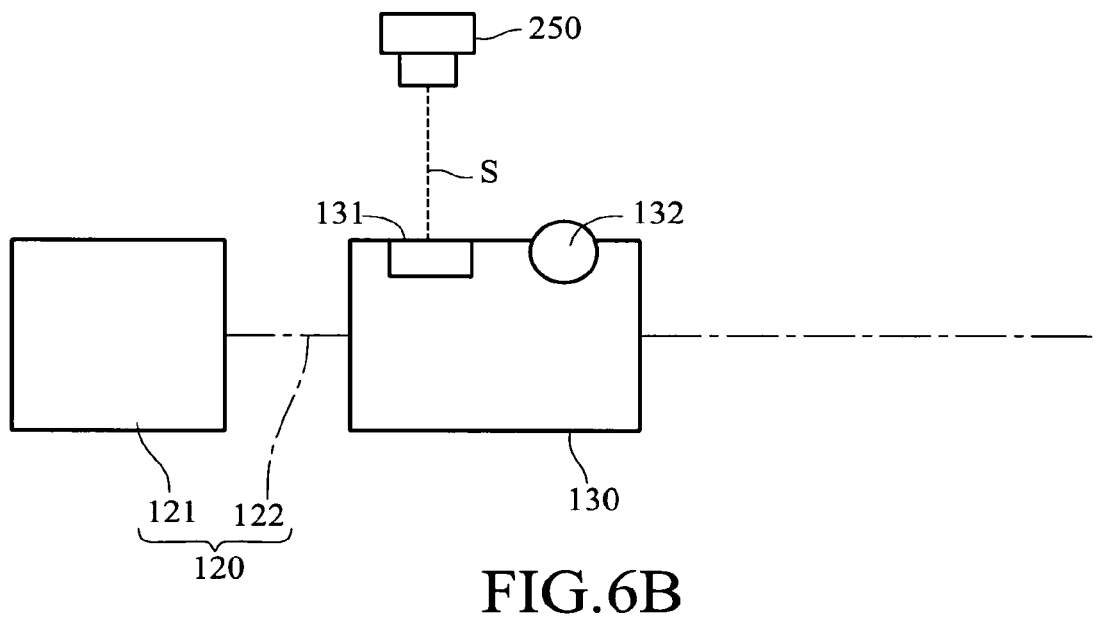

Referring to FIGS. 6A and 6B, if the image scanning module 130 is not located on the home position, the image reader 131 cannot receive the detecting light S emitted from the detecting light source 250 in the event. As a result, the image scanning module 130 maintains at another voltage potential. After the image scanning module 130 has finished a prior scanning operation, the scanning light source 132 is turned off, and the conveying module 120 starts driving the image scanning module 130 moving from another side of the scanning platform 111 towards the home position. When the image scanning module 130 arrives at the home position, the image reader 131 receives the detecting light S emitted from the detecting light source 250. Thus, the voltage potential of the image scanning module 130 is altered to the selected one and a stopping signal is generated. The control circuit of the scanning device stops the conveying module 120 to drive the image scanning module 130, the image scanning module 130 stays on the home position, and determination of home position of the image scanning module 130 is completed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A scanning device equipped with an apparatus for determining a home position of an image scanning module, comprising:
   a housing having a scanning platform on an upper surface;
   an image scanning module which is located under the scanning platform, having an image reader and a scanning light source;
   a conveying module to drive the image scanning module to move back and forth from the home position under the scanning platform; and
   a detecting light source which is located above the scanning platform corresponding to the home position of the image scanning module, to emit a detecting light to be received by the image reader to keep the image reader maintaining a selected voltage potential.

2. The scanning device of claim 1, wherein the conveying module includes a motor and a conveying element, the conveying element is coupled with the motor and the image scanning module.

3. The scanning device of claim 2 further comprising a control circuit to control operations of the image scanning module and the motor.

4. The scanning device of claim 2 further comprising a document feeding track which has an inlet end for feeding documents sequentially into the document feeding track and an outlet end for receiving the documents discharged from a paper path of the document feeding track corresponding to the image scanning module, the document feeding track having a detecting window over which the documents pass corresponding to the image reader, the detecting light source being located in the detecting window.

* * * * *